US009428173B2

(12) United States Patent
Stefanon et al.

(10) Patent No.: US 9,428,173 B2
(45) Date of Patent: Aug. 30, 2016

(54) VEHICLE BATTERY PRE-CHARGE FEATURE

(71) Applicants: Heraldo F. Stefanon, Huntington Beach, CA (US); Kiyoshiro Ueoka, Gardena, CA (US)

(72) Inventors: Heraldo F. Stefanon, Huntington Beach, CA (US); Kiyoshiro Ueoka, Gardena, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 84 days.

(21) Appl. No.: 14/066,609

(22) Filed: Oct. 29, 2013

(65) Prior Publication Data

US 2015/0120104 A1 Apr. 30, 2015

(51) Int. Cl.
*B60W 20/00* (2006.01)
*B60K 6/26* (2007.10)
*B60K 6/46* (2007.10)
*B60W 10/26* (2006.01)
*B60W 10/06* (2006.01)

(52) U.S. Cl.
CPC .............. *B60W 10/26* (2013.01); *B60W 10/06* (2013.01); *B60W 20/13* (2016.01); *Y02T 10/52* (2013.01); *Y10S 903/93* (2013.01)

(58) Field of Classification Search
CPC ............ B60K 6/48; B60K 6/26; B60K 6/46; B60K 6/365; B60W 10/06; B60W 10/02; B60W 30/18018; B60W 10/26; B60L 11/123; B60L 11/1837; H02J 7/1423; G06F 11/3037; G01C 21/3469
USPC ............ 701/22, 36, 103, 106, 454; 903/930; 180/65.265; 320/163, 106; 318/139; 714/46
See application file for complete search history.

(56) References Cited

U.S. PATENT DOCUMENTS

| | | | |
|---|---|---|---|
| 5,686,812 A | 11/1997 | Hotta | |
| 6,483,198 B2 | 11/2002 | Schmitz et al. | |
| 6,532,926 B1 | 3/2003 | Kuroda et al. | |
| 7,224,132 B2 * | 5/2007 | Cho | B60K 6/46 180/65.1 |
| 7,434,636 B2 | 10/2008 | Sutherland | |
| 7,545,121 B2 * | 6/2009 | Bolduc | H02J 7/1423 320/104 |
| 7,665,559 B2 | 2/2010 | De La Torre-Bueno | |
| 8,036,785 B2 | 10/2011 | Maguire et al. | |
| 8,499,201 B1 * | 7/2013 | Chiu | G06F 11/3037 714/42 |
| 2005/0080523 A1 | 4/2005 | Bennett et al. | |
| 2008/0185198 A1 | 8/2008 | Jones | |
| 2008/0275626 A1 * | 11/2008 | Ando | B60K 6/365 701/106 |

(Continued)

OTHER PUBLICATIONS

Gonder et al.; "Energy Management Strategies for Plug-In Hybrid Electric Vehicles"; Presented at the 2007 SAE World Congress, Detroit, Michigan; 5 pages; Apr. 16-19, 2007.

(Continued)

*Primary Examiner* — Yuri Kan
(74) *Attorney, Agent, or Firm* — Snell & Wilmer LLP (57) ABSTRACT

A system and a method for a hybrid vehicle for pre-charging the battery. A hybrid vehicle includes a battery having a state of charge (SOC), an engine configured to charge the battery, an actuation device having an on state and an off state, and a processor configured to activate the engine to charge the battery when the actuation device is switched to the on state until the SOC reaches a required SOC. The required SOC may be input by a driver and may exceed a normal maximum SOC utilized by the hybrid vehicle. The pre-charge feature can override the normal hybrid vehicle battery management logic. The required SOC allows the driver to perform reverse maneuvers without running out of battery power.

19 Claims, 4 Drawing Sheets

(56) References Cited

U.S. PATENT DOCUMENTS

| | | | |
|---|---|---|---|
| 2010/0217465 A1* | 8/2010 | Hoffmann | B60W 10/26 701/22 |
| 2011/0146614 A1 | 6/2011 | Wenger et al. | |
| 2011/0160992 A1 | 6/2011 | Crombez | |
| 2011/0202234 A1* | 8/2011 | Bradley | B60K 6/48 701/36 |
| 2012/0123676 A1* | 5/2012 | Seino | G01C 21/3469 701/454 |
| 2012/0179320 A1* | 7/2012 | Abe | B60K 6/26 701/22 |
| 2013/0158838 A1* | 6/2013 | Yorke et al. | 701/103 |
| 2013/0175974 A1* | 7/2013 | Bassham | B60L 11/1837 320/106 |

OTHER PUBLICATIONS

Gao et al.; "Design and Control Methodology of Plug-In Hybrid Electric Vehicles"; IEEE Transactions on Industrial Electronics; vol. 57, No. 2; pp. 633-640; Feb. 2010.

* cited by examiner

VEHICLE BATTERY PRE-CHARGE FEATURE

BACKGROUND

1. Field

The present application relates generally to battery charging and more particularly pertains to systems providing a user with control over when the battery of a hybrid vehicle is charged.

2. Description of the Related Art

Hybrid vehicles are becoming increasingly popular among consumers concerned with their environmental impact. Hybrid vehicles utilize an internal combustion engine in conjunction with an electric propulsion system. Through this hybrid system, hybrid vehicles achieve better fuel economy over a conventional vehicle, which helps reduce the carbon footprint of an individual by lessening the creation of toxic byproducts normally generated when operating a conventional vehicle utilizing only an internal combustion engine. The electric propulsion system can be powered by a battery, which requires recharging. In hybrid vehicles, hybrid system control logic monitors a battery state of charge to determine when to recharge the battery. The hybrid system control logic activates an engine to charge the battery as needed. In certain performance ranges, the engine is forced to turn on in order to charge the battery. This allows a driver to drive the vehicle without having to constantly or actively manage a battery state of charge. The driver does not directly control when the battery is charged.

The normal hybrid system control logic automatically determines when to charge the battery to maintain the battery state of charge. However, certain driving maneuvers may require more power than available from the normal battery state of charge. For instance, when driving the vehicle in reverse, such as reverse parking on an incline or reversing with a trailer, the vehicle may require more power than expected for common maneuvers. Unfortunately, if the battery state of charge is diminished, the driver may have difficulty performing such reversing maneuvers because the vehicle may not have sufficient power to do so. The driver may be better able to anticipate or recognize when such maneuvers will be performed. Thus, there is a need for allowing the driver to manually activate the engine in order to charge the battery at a desired time.

SUMMARY

The present application describes a pre-charge feature for a hybrid vehicle's battery. The pre-charge feature can override a normal hybrid vehicle battery management to force charging of the battery. The battery may be charged to a state of charge (SOC) above an optimized upper threshold SOC utilized by the normal hybrid vehicle battery management system.

In one implementation, a system for pre-charging a hybrid vehicle comprises a battery having a state of charge, an engine coupled to the battery and configured to charge the battery, an actuation device having an on state and an off state, and a processor coupled to the battery and the engine and configured to activate the engine to charge the battery when the actuation device is switched to the on state until the state of charge reaches a required state of charge.

In another implementation, a hybrid vehicle comprises a battery having a state of charge, an engine configured to charge the battery, an actuation device having an on state and an off state, and a processor configured to activate the engine when the actuation device is switched to the on state until the state of charge reaches a required state of charge.

In yet another implementation, a method for pre-charging a hybrid vehicle comprises receiving an on signal from an actuation device, activating, using a processor coupled to an engine and a battery, the engine when the actuation device is in an on state, and charging the battery, using the engine, until a state of charge of the battery reaches a required state of charge.

BRIEF DESCRIPTION OF THE DRAWINGS

Other systems, methods, features, and advantages of the present disclosure will be or will become apparent to one with skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the important features of the present disclosure. In the drawings, like reference numerals designate like parts throughout the different views, wherein:

DETAILED DESCRIPTION

Apparatus, systems and methods that implement the implementations of the various features of the present application will now be described with reference to the drawings. The drawings and the associated descriptions are provided to illustrate some implementations of the present application and not to limit the scope of the present application. Throughout the drawings, reference numbers are re-used to indicate correspondence between referenced elements.

Figure 1:
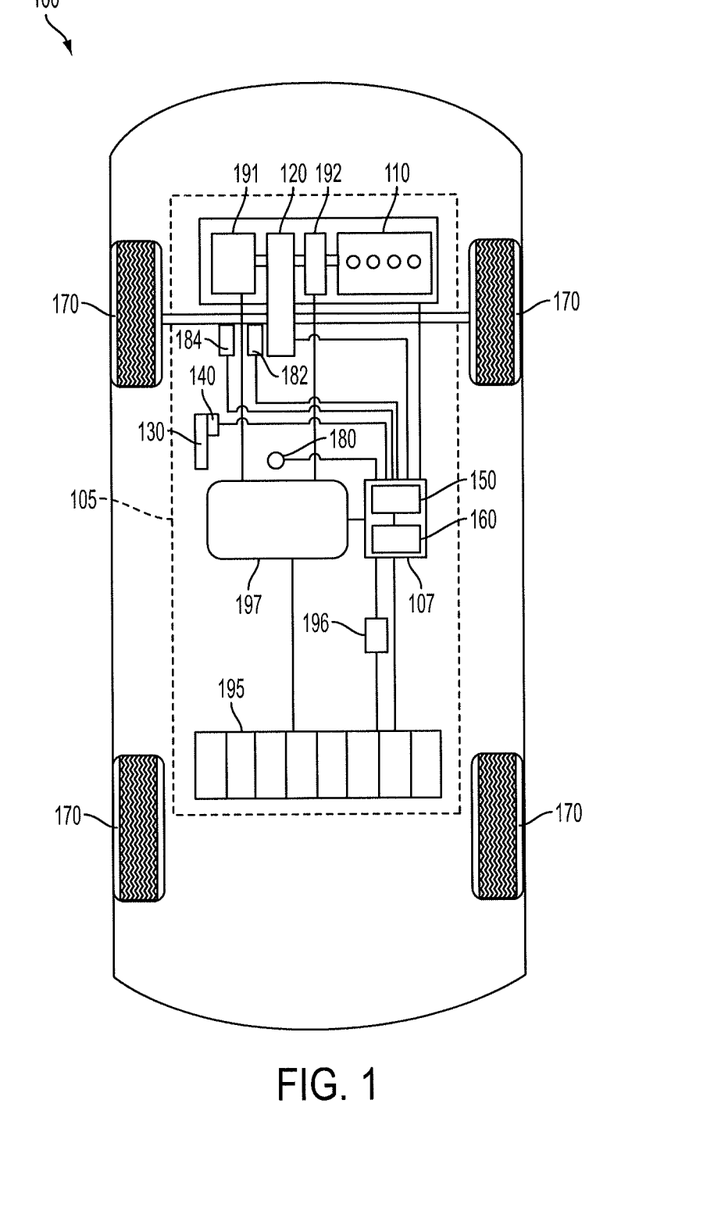
FIG. 1 is a diagram of a hybrid vehicle drivetrain, according to an implementation of the present application.

In one implementation, the present application includes a hybrid vehicle 100 as shown in FIG. 1. The hybrid vehicle 100 can include a drive force unit 105 and wheels 170. The drive force unit 105 further includes an engine 110, an electric motor-generator 191, an electric motor-generator 192, a battery unit 195, a battery module 196, an inverter box 197, a brake pedal 130, a brake pedal sensor 140, a transmission 120, a hybrid controller module 107, a button 180, a sensor 182, and a shifter 184. The hybrid controller module 107 includes a memory 160 and a processor 150.

The engine 110 primarily drives the wheels 170. The engine 110 can be an internal combustion engine. The internal combustion engine can combust fuel, such as gasoline, ethanol, diesel, biofuel, or other types of fuels which are suitable for combustion. The torque output by the engine 110 is received by the transmission 120. The motor-generators 191 and 192 can also output torque to the transmission 120. The engine 110 and the motor-generators 191 and 192 may be coupled through a planetary gear (not shown in FIG. 1). The transmission 120 delivers an applied torque to the wheels 170. The torque output by the engine 110 does not directly translate into the applied torque to the wheels 170.

The motor-generators 191 and 192 can serve as motors which output torque in a drive mode, and can serve as generators to recharge the battery unit 195 in a regeneration mode. The electric power delivered from or to the motor-generators 191 and 192 passes through the inverter box 197 to the battery unit 195. The brake pedal sensor 140 can detect pressure applied to the brake pedal 130, which may further affect the applied torque to the wheels 170. The shifter 184 allows the driver to select between forward and reverse directions.

The sensor 182 may be one or more of various sensors which may aid in the operation of the hybrid vehicle 100. The sensor 182 may be a speed sensor connected to an output shaft of the transmission 120 to detect a speed input which is converted into a vehicle speed by the processor 150. The sensor 182 may be an accelerometer connected to the body of the hybrid vehicle 100 to detect the actual deceleration of the hybrid vehicle 100, which corresponds to a deceleration torque. The sensor 182 may be a grade sensor capable of detecting a grade of the surface on which the hybrid vehicle 100 is traveling. The sensor 182 may be a GPS unit capable of detecting a location of the hybrid vehicle 100.

The button 180 may be a button on an instrument panel (not shown in FIG. 1) of the hybrid vehicle 100, or may be located elsewhere within the driver's reach, such as on or near a steering wheel, or on the dash. The button 180 may be a switch or other similar device having an on state and an off state, and capable of sending a signal indicating the on or off state. Alternatively, the button 180 may be a touch-sensitive area on a display screen capable of sending signals which may be interpreted as on or off. The processor 150, connected to the display screen, may detect a signal from the button 180 to activate a pre-charge logic.

The transmission 120 is a transmission suitable for a hybrid vehicle. The transmission 120 can be an ECVT (electrically controlled variable transmission), which is coupled to the engine 110 as well as to the motor-generators 191 and 192. The transmission 120 can deliver torque output from a combination of the engine 110 and the motor-generators 191 and 192. The processor 150 controls the transmission 120, utilizing data stored in the memory 160 to determine the applied torque delivered to the wheels 170. For example, the processor 150 may determine that at a certain vehicle speed, the engine 110 should provide a fraction of the applied torque to the wheels 170 while the motor-generator 191 provides most of the applied torque. The processor 150 and the transmission 120 can control an engine speed of the engine 110 independently from the vehicle speed.

The battery unit 195 is a rechargeable battery that is capable of being utilized in a vehicle and may include a plurality of battery cells. The battery module 196 is capable of measuring parameters that are communicated to the processor 150 for determining an SOC of the battery unit 195 and/or an SOC of the hybrid vehicle 100. The battery module 196 may measure a voltage, a current, a temperature, charge acceptance, an internal resistance, self-discharges, magnetic properties, a state of health and/or other states or parameters of the battery unit 195. In other implementations, the SOC may be determined by coulomb counting, quantum mechanism, impedance spectroscopy or a hydrometer. In one implementation, the battery module 196 is a Battery Management System (BMS) which determines the SOC of the battery unit 195 using its sensors and its own processor.

In another implementation, the hybrid vehicle 100 may not include a BMS, and the processor 150 may determine the SOC of the hybrid vehicle 100 using sensor data from the battery module 196.

In one implementation, the processor 150 may determine an SOC percentage or ratio of the vehicle based on an energy value stored in the battery unit 195 or the hybrid vehicle 100 relative to the current charging capacity of the battery unit 195 or the hybrid vehicle 100. The stored energy may be obtained through charging, regenerative braking or other means. In another implementation, the SOC may be determined based on the stored energy value relative to a reference capacity for the battery unit 195 or the hybrid vehicle 100. In yet another implementation, the SOC may be measured as a percentage or a ratio relative to another predetermined value associated with the battery unit 195 or the hybrid vehicle 100. Other systems or methods known in the art for determining an SOC percentage, value or number may be utilized without limiting the scope of the present disclosure.

Conventional vehicles use a torque converter or a clutch to reverse the torque from the engine when shifted in reverse. However, hybrid vehicles utilize an ECVT, which does not have a reverse gear. The engine creates a torque in one direction only, and without a reverse gear, the engine cannot be used for reversing the vehicle. Instead, a motor-generator is connected to the wheels through a planetary gear. To reverse, the motor-generator creates a reverse torque. The engine is not used when the hybrid vehicle is reversing. Thus, the hybrid vehicle relies solely on battery power for reversing.

When the battery unit has a sufficient SOC, the hybrid vehicle may perform reverse maneuvers. Certain reverse maneuvers, such as reverse parking on an incline or reversing with an attached trailer, require more battery power, requiring a higher SOC. When the SOC is insufficient, the hybrid vehicle normally turns on the engine in order to recharge the battery unit and increase the SOC. The hybrid vehicle manages the SOC during normal driving, to maintain a minimum SOC while considering fuel efficiency. However, the hybrid vehicle does not anticipate when the driver wishes to perform reverse driving maneuvers.

Figure 2A:
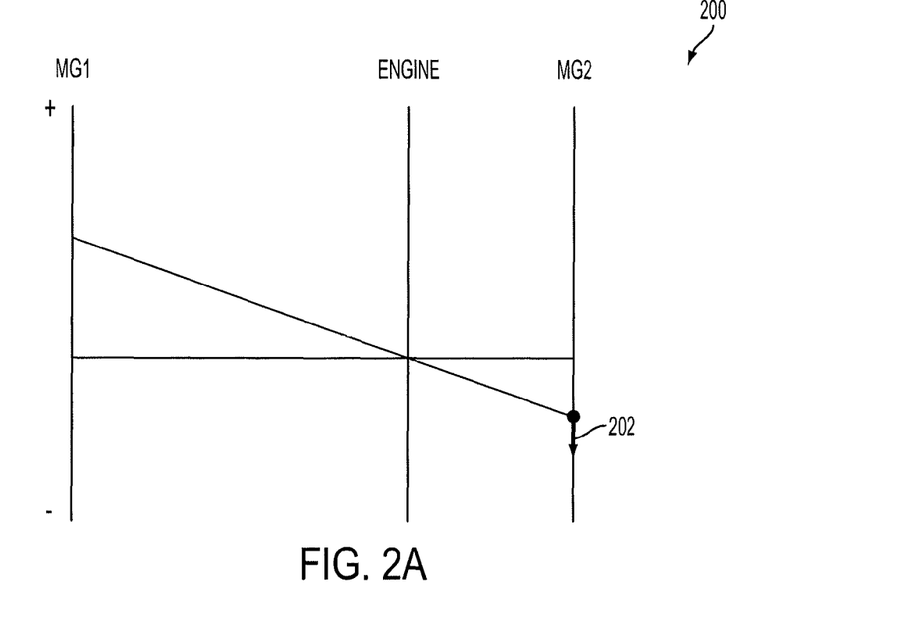
FIG. 2A is a nomograph of the link between an engine and two motor-generators during a normal reverse, according to an implementation of the present application.
Figure 2B:
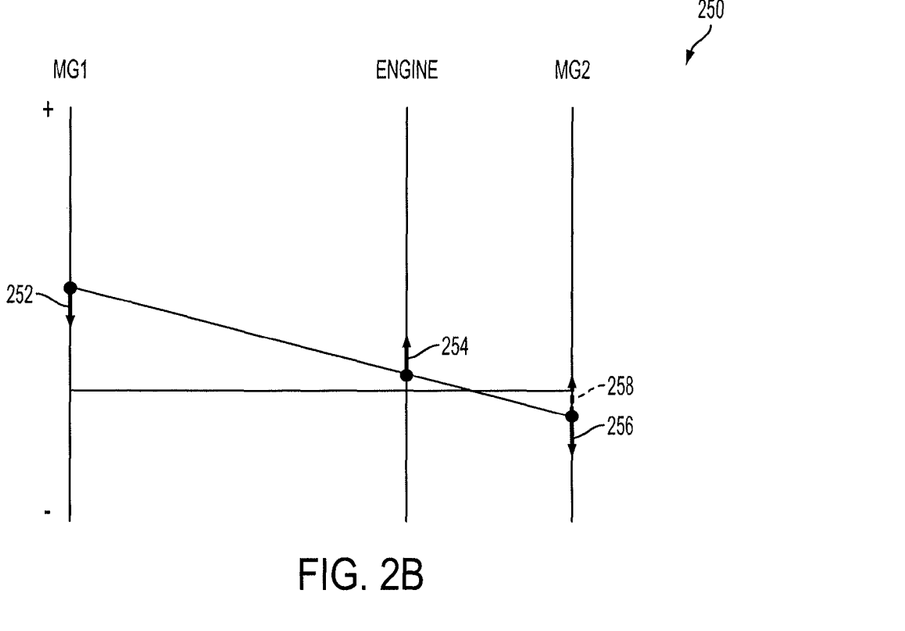
FIG. 2B is a nomograph of the link between of the engine and two motor-generators during a reverse with a low SOC, according to an implementation of the present disclosure.

FIGS. 2A and 2B present nomographs which show the link between the torques of an engine, and two motor-generators, labeled MG1 and MG2. The engine may correspond to the engine 110 in FIG. 1, and MG1 and MG2 may correspond to motor-generators 191 and 192 in FIG. 1. Because the engine, MG1, and MG2 are connected by the planetary gear, the engine, MG1, and MG2 cannot produce torques completely independent of the others. More specifically, because the engine, MG1, and MG2 are connected by the planetary gear, if one of the components changes its rpm (revolutions per minute), the others are affected. The y-axis corresponds to positive and negative rpm. Because MG2 is further connected to the wheels, the rpm of MG2 also directly relates to the vehicle speed. When MG2 has a positive rpm the vehicle is travelling in a forward direction. When MG2 has a negative rpm the vehicle is travelling in reverse. The arrows depict torques, either positive or negative.

FIG. 2A presents a nomograph 200 of the vehicle normally reversing. The engine cannot produce a negative torque to make the vehicle reverse and is therefore disabled. The engine has 0 rpm and produces 0 torque. The hybrid system monitors the SOC, and normally the battery has a sufficient SOC to reverse such that the engine does not need to recharge the battery. MG2, which is connected to the output shaft of the transmission, creates a negative torque 202, which translates into reverse movement of the hybrid vehicle. With a sufficient SOC, MG2 produces enough negative torque that the hybrid vehicle can perform reverse maneuvers.

FIG. 2B presents a nomograph 250 for the case when the SOC is insufficient to perform reverse maneuvers. When the SOC is too low, the hybrid system normally turns on the engine to recharge the battery. The engine has a positive rpm and also produces some positive torque 254. MG1 has a positive rpm but a negative torque 252 to recharge the battery. However, due to the planetary gear, when the engine produces a positive torque 254 and MG1 produces a negative torque 252, a counter-torque 258 is created. The counter-torque 258 from MG1 may effectively cancel out the desired negative torque 256 from MG2. Even if not completely canceled out, the negative torque 256 may be insufficient to overcome both the counter-torque 258 and the force of gravity, when reversing on an incline. This results in the engine spinning, MG1 and MG2 spinning, but no movement of the hybrid vehicle. Thus, the hybrid vehicle burns fuel while MG1, MG2, and the engine runs, but produces no reverse movement, placing the driver in an uncomfortable position. The driver will then be left with the option of shifting into park, and recharging the battery while stationary.

To avoid this predicament, the driver may wish to have the hybrid vehicle 100 pre-charge the battery unit 195 before the driver performs reverse maneuvers. In anticipation of reverse maneuvers, the driver may wish to direct the hybrid system to charge the battery, but current hybrid systems do not give the driver that option. Rather, the driver would have to hope that the battery is sufficiently charged from normal driving, or will have to sit in park to re-charge. The hybrid vehicle 100 advantageously presents the driver an option to manually force pre-charging, overriding the hybrid system's normal battery management.

Figure 3:
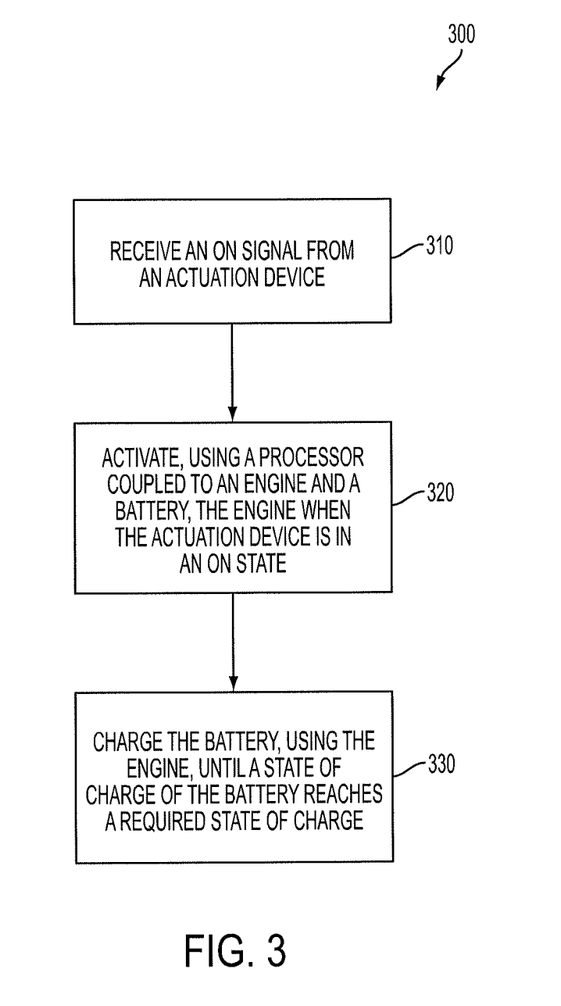
FIG. 3 is a flowchart for a pre-charge logic, according to an implementation of the present disclosure.

FIG. 3 presents a flowchart 300 depicting a method for pre-charging according to one implementation of the present disclosure. At 310, an on signal from an actuation device is received by the driver and/or the processor 150. In the hybrid vehicle 100, the button 180 can be switched to an on state, or otherwise send the on signal to the processor 150.

The driver may decide to turn on the pre-charge logic through the button 180. In alternative implementations, the processor 150 may automatically activate the pre-charge logic when certain conditions are met. The memory 160 may store, either from a manual input from the driver or from a history of actions, a location in which the pre-charge feature is commonly used. For example, the driver may live on a hill, and requires a pre-charge before parallel parking on the hill. The sensor 182 may be a GPS unit which alerts the processor 150 that the hybrid vehicle 100 is nearing the hill. The processor 150 may further consider the surroundings to determine if a pre-charge is needed. For instance, the driver may be near a trailer park detected by the sensor 182, which may trigger a pre-charge in anticipation of towing a trailer in reverse. By storing the location, the processor 150 may automatically start the pre-charge logic when nearing or at the location.

The processor 150 may further automatically start the pre-charge logic at a specific time, such as a time the driver normally drives home. The processor 150 may also check other conditions, such as a steep grade detected by the sensor 182, which may require a pre-charge.

In addition to activating the pre-charge logic, the driver may wish to set a required SOC. The hybrid system has a normal SOC window, such as an SOC window 410 in FIG. 4, which may be stored in the memory 160 or another memory wirelessly connected. The normal SOC window or area may delimit the SOC during normal operation. When the SOC reaches the minimum or the lower threshold of the SOC window, the processor 150 activates the engine 110 to recharge the battery unit 195. When the SOC reaches the maximum or the upper threshold of the SOC window, the processor 150 turns off the engine 110 to stop charging the battery unit 195. The SOC window may be pre-determined and set based on maximizing the life of the battery unit 195. The SOC window may have been previously bench tested and determined to be suitable for normal driving operations.

The required SOC may be the same as the upper threshold of the SOC window. However, the driver may wish to set the required SOC above the upper threshold, such as a required SOC 420 in FIG. 4. The driver may do so through an interface in the hybrid vehicle 100 or the pre-charge logic may have a pre-set overcharge threshold. The driver may have to be notified that overcharging can negatively affect the life of the battery unit 195.

Turning back to FIG. 3, at 320, the processor 150 activates the engine 110 when the button 180 is in the on state. The pre-charge logic is activated, therefore the processor 150 turns on the engine 110, in order to charge the battery unit 195.

At 330, the battery unit 195 is charged by the engine 110 until the SOC reaches the required SOC. The required SOC may be the upper threshold of the normal SOC window, or may be a higher SOC, such that the battery unit 195 is overcharged. Once the battery unit 195 reaches the required SOC, the pre-charge logic is deactivated, and the engine may be shut off to stop charging.

The driver also has the option to prematurely end the pre-charge. The driver may push button 180 into the off state. The pre-launch logic is then disabled. The engine 110 may also be shut off to stop charging. However, the normal hybrid system logic may decide to keep the engine 110 on to continue charging, in accordance with the normal hybrid system logic.

Figure 4:
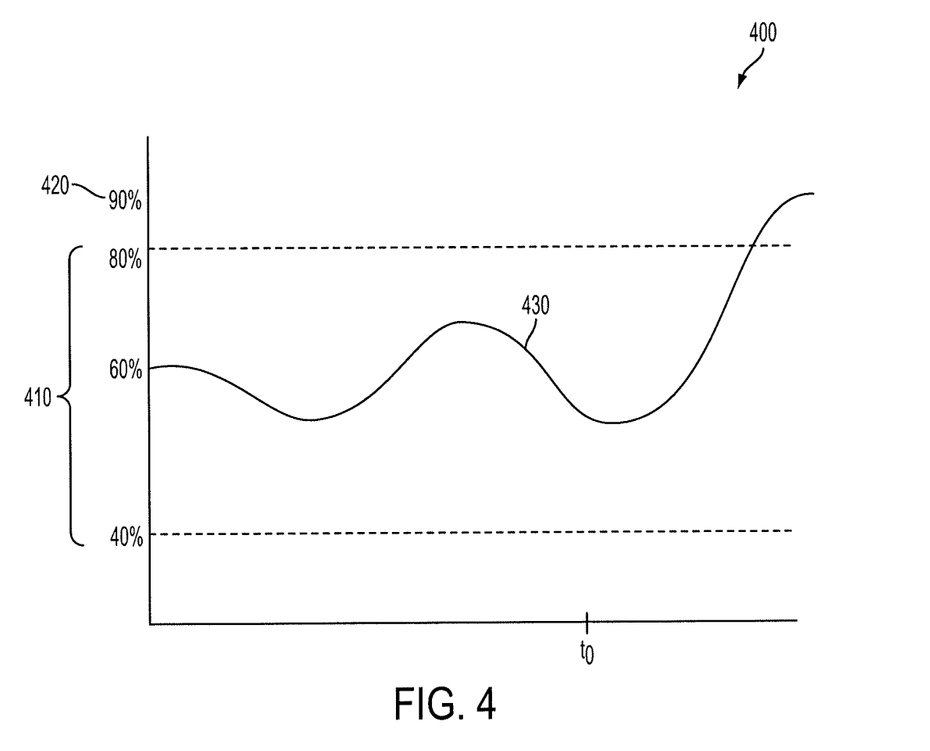
FIG. 4 is a graph of an SOC history, according to an implementation of the present disclosure.

FIG. 4 presents an SOC graph 400 illustrating the changing SOC levels. The SOC window is between 40% and 80%. The hybrid system may set 60% as a desired SOC level to maintain, such that the SOC is generally charged when below 60%, or generally discharged when above. In alternative implementations, the SOC window may have different thresholds, and the desired SOC level may be a different value as needed.

As shown by an SOC curve 430, the SOC level fluctuates as the hybrid vehicle 100 is driven. At time $t_0$, the driver pushes the button 180 to activate the pre-charge logic. The SOC level then rises to the required SOC 420, which is 90% in FIG. 4. Thus, the pre-charge logic allows the driver to manually charge the SOC to a desired level, which may exceed the SOC window 410. With the required SOC 420, the hybrid vehicle 100 can perform the reverse maneuvers.

Those of ordinary skill would appreciate that the various illustrative logical blocks, modules, and algorithm steps described in connection with the examples disclosed herein may be implemented as electronic hardware, computer software, or combinations of both. Furthermore, the present application can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described implementations are to be considered in all respects only as illustrative and not restrictive and the scope of the application is, therefore, indicated by the appended claims rather than by the foregoing description. All changes which come within the meaning and range of equivalency of the claims are to be embraced within their scope.

What is claimed is:

1. A system for pre-charging a hybrid vehicle comprising:
a battery having a state of charge;
a transmission;
an engine having an on mode, coupled to the transmission and configured to output torque when in the on mode;
a motor-generator having a drive mode and a regeneration mode, coupled to the battery and the transmission and configured to output torque to the transmission when in the drive mode and to convert torque from the transmission to electrical power for recharging the battery when in the regeneration mode;
a button configured to receive a user input to activate a pre-charge logic to increase the state of charge of the battery or a user input to deactivate the pre-charge logic; and
a hybrid controller coupled to the battery, the motor-generator, the button and the engine and configured to cause the state of charge of the battery to increase in response to the button receiving the user input to activate the pre-charge logic and the state of charge of the battery being less than or equal to an upper state of charge threshold by instructing the motor-generator to operate in the regeneration mode and instructing the engine to operate in the on mode until at least one of:
the button receives the user input to deactivate the pre-charge logic, or
the state of charge of the battery reaches or exceeds the upper state of charge threshold.

2. The system of claim 1, wherein the hybrid controller is further configured to deactivate the pre-charge logic in response to the current state of charge of the battery reaching the upper state of charge threshold.

3. The system of claim 1, wherein the hybrid controller is further configured to deactivate the pre-charge logic in response to the button being switched from the on state to the off state even when the current state of charge of the battery is below the upper state of charge threshold.

4. The system of claim 1, wherein the upper state of charge threshold corresponds to an upper threshold of a state of charge window.

5. The system of claim 1, wherein the upper state of charge threshold corresponds to a user-selected state of charge value that is above the upper threshold of the state of charge window.

6. The system of claim 1, wherein the hybrid controller is further configured to determine the upper state of charge threshold and wherein the upper state of charge threshold is different from an upper threshold of a state of charge window.

7. The system of claim 1, wherein the button includes at least one of a physical button, a physical switch or a touch-sensitive area on a display screen.

8. A hybrid vehicle comprising:
a battery having a state of charge;
a transmission;
a sensor configured to detect data usable to determine a current location of the vehicle;
a memory configured to store a stored location;
an engine having an on mode, coupled to the transmission and configured to output torque when in the on mode;
a motor-generator having a drive mode and a regeneration mode, coupled to the battery and the transmission and configured to output torque to the transmission when in the drive mode and to convert torque from the transmission to electrical power for recharging the battery when in the regeneration mode; and
a processor coupled to the battery, the sensor, the memory, the engine and the motor-generator and configured to:
compare the current location of the vehicle to the stored location, and
activate a pre-charge logic in response to the current location of the vehicle being within a predetermined distance of the stored location, the pre-charge logic causing the state of charge of the battery to increase by instructing the motor-generator to operate in the regeneration mode and instructing the engine to operate in the on mode until at least one of:

a user input to deactivate the pre-charge logic is received, or the state of charge of the battery reaches or exceeds an upper state of charge threshold.

9. The hybrid vehicle of claim 8, wherein the upper state of charge threshold corresponds to an upper threshold of a state of charge window.

10. The hybrid vehicle of claim 8, further comprising a button coupled to the processor and configured to receive user input and to toggle between an on state indicating a request for the processor to activate the pre-charge logic and an off state indicating a request for the processor to deactivate the pre-charge logic.

11. The hybrid vehicle of claim 8, wherein the sensor is a GPS unit configured to detect location data.

12. The hybrid vehicle of claim 8, wherein the stored location corresponds to a location at which the pre-charge logic was previously activated.

13. The hybrid vehicle of claim 8, wherein the sensor includes at least one of a speed sensor configured to detect speed data, an accelerometer configured to detect acceleration data or a grade sensor configured to detect a grade of a road.

14. A method for pre-charging a hybrid vehicle comprising:

receiving, at a hybrid controller coupled to an engine, a motor-generator and a battery, a first signal from a button indicating that the button has been switched from an off state, indicating that a pre-charge logic is not activated, to an on state, indicating that the pre-charge logic is activated, wherein the first signal is to increase the state of charge of the battery;

activating, by the hybrid controller, the pre-charge logic in response to receiving the first signal, the pre-charge logic causing the engine to output torque to a transmission and the motor-generator to convert torque from the transmission to electrical power for recharging the battery; and deactivating, by the hybrid controller, the pre-charge logic in response to at least one of:

receiving a second signal from the button indicating that the button has been switched from the on state, indicating that the pre-charge logic is activated, to the off state, indicating that the pre-charge logic is not activated, or determining a current state of charge of the battery reaches or exceeds an upper state of charge threshold.

15. The method of claim 14, further comprising determining, by the hybrid controller, the upper state of charge threshold.

16. The method of claim 15, wherein the upper state of charge threshold is determined based on user-defined requirements.

17. The method of claim 14, further comprising determining, by the hybrid controller, that a current location of the hybrid vehicle is near a stored location that corresponds to a location at which the pre-charge logic was previously activated and activating, by the hybrid controller, the pre-charge logic in response to determining that the current location is near the stored location.

18. The method of claim 14, further comprising determining, by the hybrid controller, to activate the pre-charge logic based on data detected by a sensor.

19. The method of claim 18, wherein the sensor is a clock and the data corresponds to time data.

* * * * *